Aug. 3, 1954  H. G. SLOTTOW ET AL  2,685,200
ELECTROMAGNETIC WEIGHING DEVICE
Filed March 27, 1952  2 Sheets-Sheet 1

INVENTORS
Hiram G. Slottow
Turner L. Smith
BY
ATTORNEYS

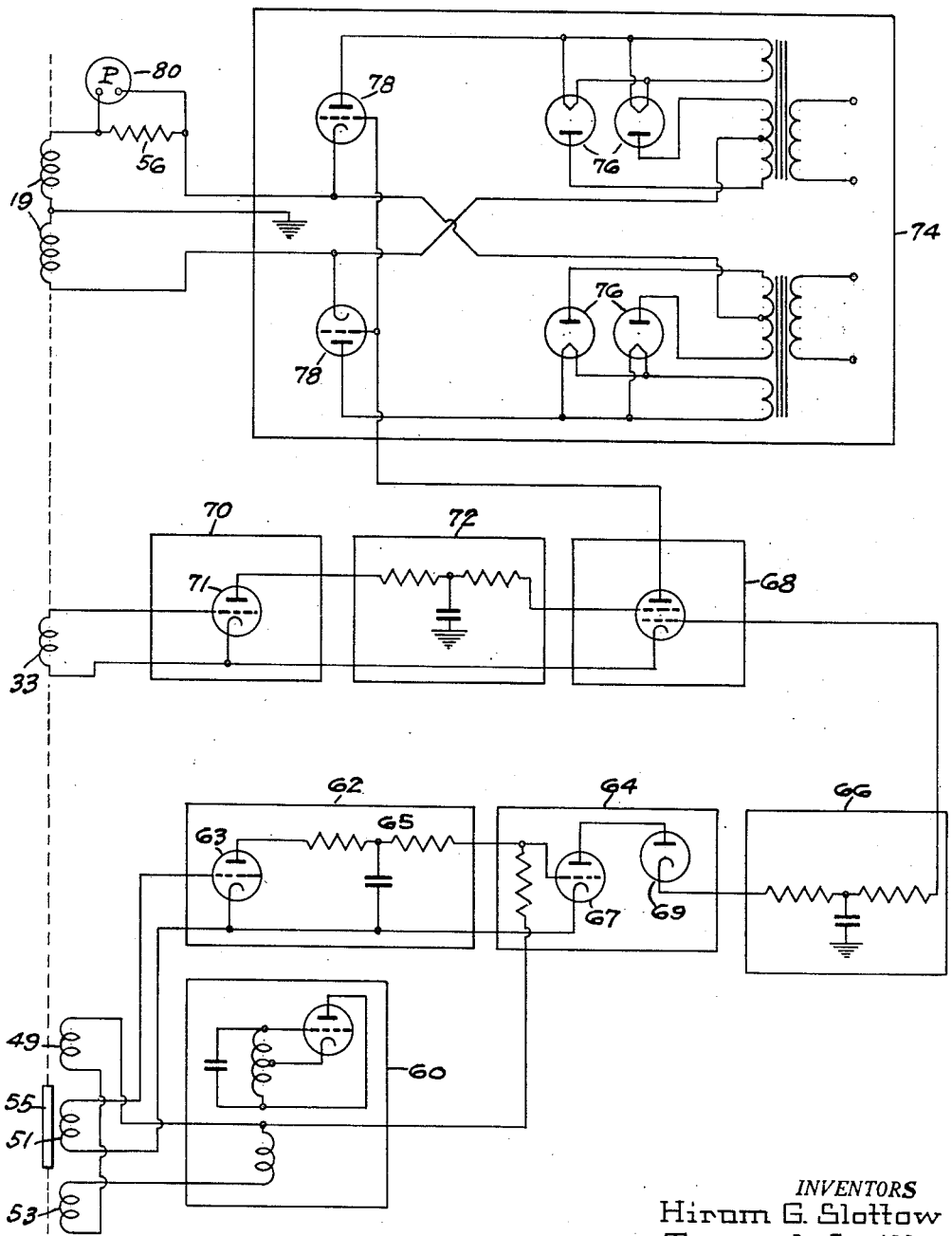

Patented Aug. 3, 1954

2,685,200

UNITED STATES PATENT OFFICE 2,685,200

ELECTROMAGNETIC WEIGHING DEVICE

Hiram G. Slottow, Baltimore, and Turner L. Smith, Havre de Grace, Md., assignors to the United States of America as represented by the Secretary of the Army Application March 27, 1952, Serial No. 278,975

5 Claims. (Cl. 73—141)

(Granted under Title 35, U. S. Code (1952), sec. 266)

The invention described herein may be manufactured and used by or for the Government for governmental purposes without the payment of any royalty thereon.

Our invention relates to weighing systems especially useful for wind tunnel applications and particularly to the electromagnetic type of balance. We have provided a novel electrically controlled electromagnetic system which has performance characteristics uniquely suited for its intended purpose.

A wind tunnel balance system consists, broadly, of a force resolving structure to isolate the aerodynamic forces on a model and a set of scales to measure these forces. The system must, primarily, be capable of measuring forces accurately. Although requirements vary from one test to another a wind tunnel balance system must often be accurate to within 0.1% of the maximum force for the test run. This may occur, for example, when small differences in lift and moment, which define the center of pressure at small angles of attack, must be known to within an error of several percent. This error may be only a small fraction of a percent of the large forces present at larger angles of attack.

The balance system must also measure accurately a wide range of forces. Models having wing surfaces may be subjected to load forces approaching one hundred pounds while the largest forces developed on models without wings or control surfaces may be only a small fraction of a pound. An acceptable figure for the ratio of maximum loads in extreme test conditions is 100. This implies that if an accuracy of 0.1% of maximum load is to be maintained, the system must be capable of resolving a force of $10^{-5}$ times the largest force it will accept.

A high accuracy figure imposes an additional requirement on the system. The resolving structure through which the forces are coupled is designed so that in the zero position the desired force components are isolated at the appropriate scales. A displacement of the balance from this position is accompanied by the appearance at each scale of portions of the other components. If the displacement is limited to 0.001 inch these interaction components are either negligible or they can be easily corrected for in the reduction of the data. The scales must therefore be stiff as well as accurate.

Wind tunnel forces frequently have small alternating forces in addition to the steady component which is of most interest. Since these small oscillations must not introduce appreciable error into the measurement of the direct component, the relationship between the applied force and the displacement must be essentially linear over a range represented by the amplitude of the oscillations—about 2 percent of the steady component. Over a complete force range the force-displacement relationship should be approximately linear. Interaction components can then be more easily corrected for and the reduction of data and the dynamics of the complete system are more easily studied by the methods of linear theory.

A desirable characteristic of a wind tunnel balance system is a fast response time. A time constant of no greater than several seconds makes feasible the use of an automatic recorder to plot forces against angle of attack during the test. Still smaller time constants make possible the recording of low frequency transients and contribute to limiting the amplitude of forced oscillations by maintaining stiffness at higher frequencies. The balance must be stable. This requirement, although obvious, warrants serious consideration because every automatic balance under some conditions can become unstable. If the balance combines high stiffness and small time response with the multi-resonant dynamics of the resolving structure the tendency toward unstability is strong.

The prior practice in wind tunnel measurements has been to use a beam balance or a mechanical spring scale. However the dynamic response of the beam balance is poor because of the required time intervals for changing or moving weights; and the spring scale experiences difficulties when small displacements are measured because thermal expansion effects produce greater displacements at the point of measurement than do the applied forces.

It is therefore an object of our invention to produce an electromagnetic measuring system that operates with extremely high accuracy and obviates the difficulties of the prior devices.

Other objects and advantages of our construction will become obvious throughout the course of the following description in which:

Figure 3 is a schematic wiring diagram of the electrical circuit of my invention.

Our invention contemplates the use of a modification of an electromagnetic device that combines the excellent dynamic properties of a spring with the accuracy of beam balance. The device is known as the Eastman Pot and has been described in an article by F. S. Eastman entitled "The Electromagnetic Balance—A High Precision Measurement and Control Device" at page 284 of Instruments, October 1941. The Eastman Pot consists of a current carrying coil that is constrained to move in a direction normal to the field of permanent magnet. Applied forces displace the shaft until they are balanced by opposing forces resulting from the interaction of the coil current and the magnetic field. The magnitude and direction of the coil current is controlled by an amplifier. Eastman Pot in this form is an accurate instrument but it is not sufficiently stiff to meet modern wind tunnel requirements. If stiffening this system by increasing the amplifier gain is attempted then the dash pots become inadequate and must be changed commensurate therewith, which change is difficult to accomplish. Our measuring system, which was developed at Aberdeen Proving Ground, has resulted in a balance structure which will weigh up to 40 pounds at a stiffness of over 100,000 lb./in. We have achieved stability at this high stiffness by inserting into the amplifier a signal proportional to the velocity of the coil and a signal proportional to the displacement of the coil together with filters in the transmission circuits as will later appear.

Figure 1:
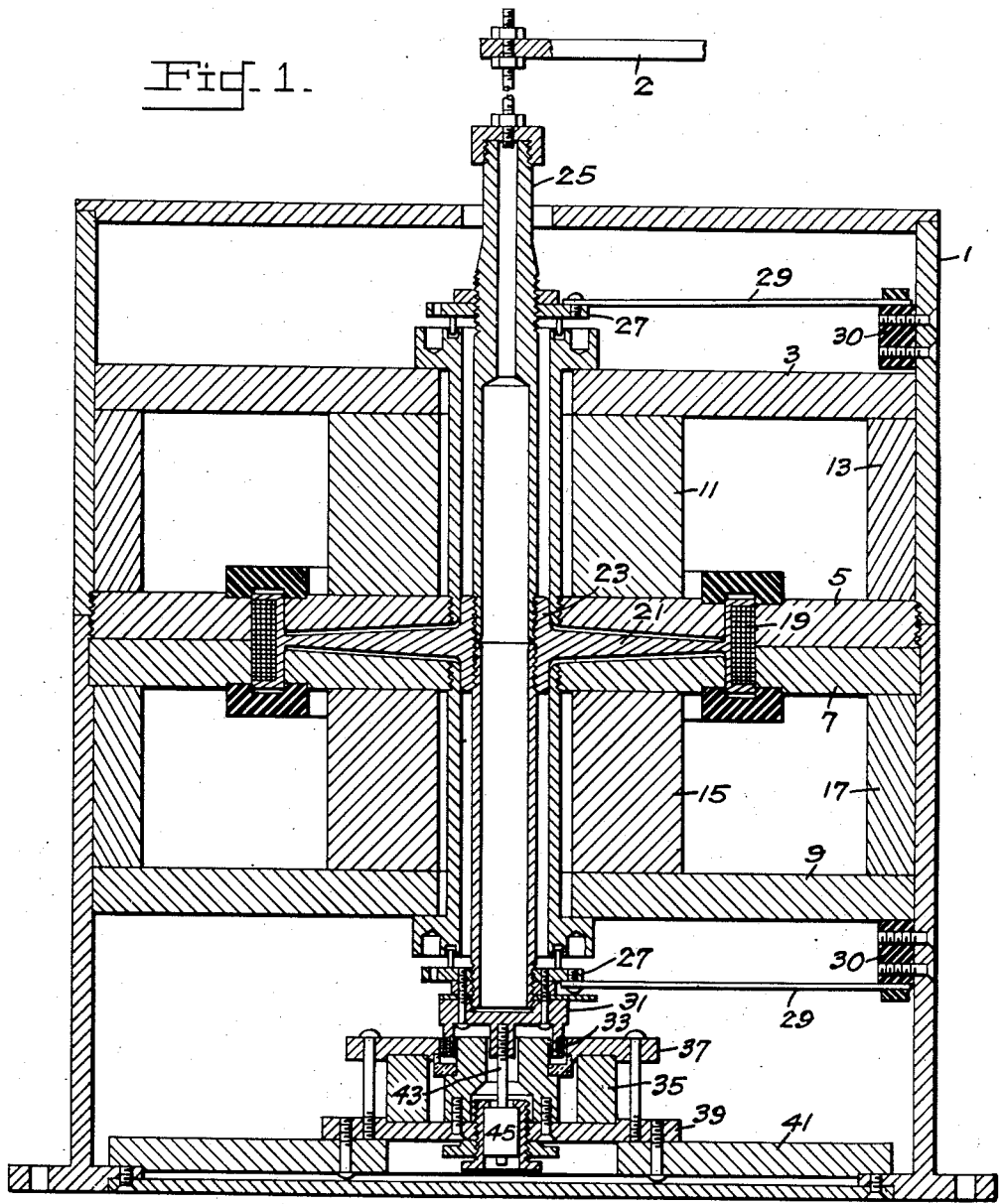
Figure 1 is an elevation partly in section of the electromagnetic force receiving device.

Referring now to the drawings wherein like reference characters indicate like parts and particularly to Figure 1, which shows generally an elevation in section of the Eastman Pot structure as modified and wherein reference character 1 indicates generally a built up protective casing or cover supporting therein concentric discs 3, 5, 7 and 9 which are axially spaced substantially as shown and carry therebetween in sandwiched relation annular permanent magnet members 11, 13, 15 and 17. Annular force coil 19 is wound on wheel member 21 which has a hub 23 threadedly engaging shaft 25. Flexure hinges 29 are secured between shaft collars 27 and shoulders 30, which hinges are stiff horizontally and weak vertically to prevent lateral motion but not to interfere with vertical motion. A beam 2 is secured to shaft 25 to transmit force thereto.

Firmly secured to the lower end of shaft 25 is plug 31 which carries the velocity coil 33 in the air gap of the magnetic circuit formed by a permanent magnet 35, end ring 37 and end disc 39. End disc 39 is rigidly secured to plate 41 to provide a firm support for the magnetic circuit.

Figure 2:
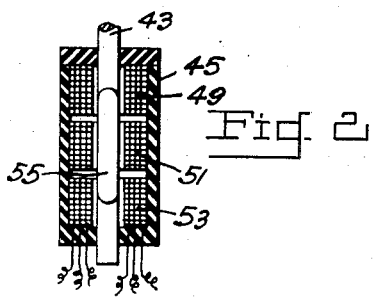
Figure 2 is an elevation in section of a detail of the device of Figure 1.

Threaded member 43 engages a boss in plug member 31 fastened to shaft 25 and passes within differential transformer casing 45. The transformer details are best seen in Fig. 2 and comprise an outer insulating casing 45 and three concentric axially spaced coils 49, 51 and 53. Coil 51 is the secondary of the transformer and coils 49 and 53 are the primaries. A magnetic core 55 is secured to member 43 for vertical motion for a purpose that will later appear.

It will be readily seen that vertical motion of shaft 25 will cause motion of coils 19 and 33 in a direction perpendicular to the flux in their respective magnetic circuits and will displace magnetic core 55 of the differential transformer from the symmetrical position shown in Figure 2. In its neutral position the steel core 55 provides similar flux paths from each primary section to the secondary 51 and the induced voltage is zero, but when the core is displaced from such neutral position, as by vertical motion of shaft 25 the flux linkages from one primary section increase while the flux linkages from the other decrease and a voltage is induced across the secondary. The magnitude of this voltage is proportional to the displacement. This signal is amplified, detected and filtered before it is introduced into a final mixer stage as will later appear.

The coil 33 of the velocity pickup provides a voltage that is proportional to shaft velocity. This voltage is separately amplified before it is fed to the final mixer as will presently be explained.

The output signal from the final mixer drives the current amplifier which as explained above controls the magnitude and direction of the current in the force coil to counterbalance the force applied to the shaft.

An accurate measure of the force is obtained from the voltage across a resistance 56 in series with the force coil and in practice an automatic potentiometer which accepts signals of either polarity and gives 10,000 divisions for the full scale, is used for this measurement.

Referring now to Figure 3 which is a greatly simplified wiring diagram of our novel system it will be noted that the various system components are illustrated in substantially block diagram form. This method of illustration was chosen in the interests of conciseness and clarity and to avoid burdening the record with a great mass of detail which would necessarily follow if the exact wiring diagram were presented. In the description that follows an occasional reference will be made to the exact circuit used in practice when such circuit is necessary for the purpose of revealing the operation of the system as an accurate electromagnetic scale.

An oscillator, shown generally as 60 which drives the differential transformer and provides the reference signals is a conventional Wein Bridge oscillator. We have shown a standard Hartley type oscillator to represent in quasi symbolic form the circuit here used. The frequency of oscillation of our circuit is maintained at 5 kc. and it was found that with an exciting signal of 3.5 volts at the above frequency the sensitivity of the transformer is 6.38 volts per inch.

The secondary of the differential transformer which reflects the output produces a signal which is fed into the displacement amplifier 62 represented by a single amplifier stage 63, and in practice comprises a pair of two stage feed back amplifiers. A filter 65 removes the third harmonic and passes the amplified signal into the detector stage 64 where it is introduced together with a signal from oscillator 60 into a mixer tube 67 where the signals are joined and amplified and are then detected by a simple diode detector 69 and passed through a filter 66 to reduce the high frequency response to meet stability requirements and the signal is then fed to the final mixer stage 68.

The velocity coil 33 has a force factor which was found to be 2.15 lbs. per ampere and a sensitivity of 2.92 volts per foot per second. To raise the velocity signal to useful levels it is fed to an amplifier 70 which has a maximum gain of 1200 and is represented by a single stage 71. The signal is passed through a filter 72 and then to the beforementioned final mixer stage 68.

The final mixer stage 68 receives the displacement and velocity signals and comprises two balanced cathode follower input stages to lower the impedance of the signals and a push pull mixer stage. The overall gain is 2.5 and the output of the mixer stage is directly coupled to the current amplifier 74. We show the mixer symbolically as a single tube.

The current amplifier 74 which drives the force coil 19 is a bridge circuit comprising a power supply 76 in each of two opposite arms and a set of control tubes 78 in each of the remaining arms. Each control tube 78 represents five triodes in parallel. Reference numeral 19 is the force coil, 56 is a resistor in series therewith and 80 indicates a potentiometer to measure the current flowing in the force coil. When the bridge comprising the power supplies and the control tubes is at balance no current flows in the force coil and the circuit would operate most efficiently at cut off bias. The circulating currents would then be zero at balance and power would be delivered only when needed. The discontinuity at balance would be objectionable however so the bias is set at −70 volts to allow a moderate current ($8 \times 10^{-3}$ amp) to flow in each tube. As the load increases the current in one set of tubes increases while the current in the other set decreases. The difference between these currents flows in the force coil and establishes the reaction force. At full load however the grid-cathode voltage for one set of tubes is zero, the other set is beyond cut off and all the current in the conducting supply flows through the coil. The load carrying capacity of the system is therefore not limited by waste current. With a current of .315 amperes the reaction force is 39.4 pounds and for a short time the system can carry up to 43.7 pounds.

It can be seen from the above description that we have provided an electromagnetic balance wherein the reaction forces are derived from signals proportional to velocity and displacement and the interaction of the system results in an accurate balance with extremely high stiffness.

The herein shown illustrated embodiment is a preferred form of our invention. It is to be understood however that the invention is not limited to the precise construction herein taught, the same being merely illustrative of the principles of the invention.

We claim:

1. A force measuring system comprising in combination a shaft, means for applying a force to said shaft tending to displace the same, a first coil fixed to said shaft for motion in a field of flux, a second coil fixed to said shaft and arranged to move in a field of flux to produce an electrical signal proportional to the velocity of displacement of the said shaft, a differential transformer connected to said shaft to produce an electrical signal proportional to the displacement of the said shaft, an electronic amplifier connected to said second coil to receive and increase the velocity signal, an electronic amplifier connected to said differential transformer to increase the displacement signal; the respective outputs of the said amplifiers connected to a mixer stage for combining and amplifying the said velocity and displacement signals, an amplifier to receive the said combined signals to produce a current proportional thereto and connected to the said first coil whereby a reaction force is developed, and means to measure the said current.

2. A force measuring system comprising in combination a shaft, means for applying a force to said shaft tending to displace the same, a differential transformer connected to said shaft in normally balanced relation for producing a first electrical signal proportional to displacement of said shaft, a first coil fixed to said shaft and disposed in a field of flux for producing a second electrical signal proportional to the velocity of displacement of the said shaft, a mixer stage for combining and amplifying the said first and second signals, an amplifier stage controlled by the combined and amplified first and second signals to produce a current proportional to the said force and a second coil fixed to said shaft and disposed in a field of flux to carry the said current to produce a reaction force, and means to measure the said current.

3. A force measuring system comprising a shaft mounted for longitudinal motion and substantially fixed against radial motion, first means for producing a field of flux and forming a first annular air gap concentric with said shaft, a first coil fixed to said shaft and extending in said air gap, second means for producing a field of flux and forming a second annular air gap concentric with said shaft, a second coil fixed to said shaft and extending in said second air gap, a transformer comprising three concentric coils disposed in axially spaced relation and surrounding a magnetic core, said magnetic core depending from said shaft and movable therewith, means for exciting said transformer, means for applying a force to said shaft tending to move the same whereby an electrical signal is produced in said transformer proportional to the degree of motion of the said shaft and an electrical signal is produced in said second coil proportional to the velocity of motion of the said shaft, a mixer stage for receiving and combining the said signals and an amplifier stage controlled by the said combined signals for producinng a current proportional to the said combined signals, said current conducted to flow through the said first coil to react with the said field of flux to counterbalance the said force.

4. In a force measurer for a testing machine, a shaft, means mounting said shaft for axial displacement only in response to a force applied thereto, means responsive to displacement of said shaft to produce a first electrical signal proportional to displacement thereof, means responsive to the velocity of axial displacement of said shaft to produce a second electrical signal proportional to the instantaneous velocity thereof, means combining and amplifying said first and second signals to produce a resultant current, means responsive to said resultant current to apply a force to said shaft opposing displacement thereof, and means for measuring said resultant current as a measure of said force.

5. A force measuring system comprising in combination a shaft, means for applying a force to said shaft tending to displace the same, a differential transformer connected to said shaft to produce an electrical signal proportional to the displacement thereof, a coil fixed to said shaft and movable in a field of flux to produce an electrical signal proportional to the velocity of said shaft, means to combine and amplify said signals, means controlled by the combined and amplified signals to produce a current proportional to the said force, a second coil fixed to said shaft and movable in a second field of flux to receive said current and produce a reaction force, and means to measure the said current.

References Cited in the file of this patent

UNITED STATES PATENTS

| Number | Name | Date |
| --- | --- | --- |
| 2,371,040 | Fisher et al. | Mar. 6, 1945 |
| 2,571,863 | Godsey | Oct. 16, 1951 |
| 2,602,660 | Shannon | July 8, 1952 |
| 2,610,052 | MacGeorge | Sept. 9, 1952 |